United States Patent [19]

Denne

[11] Patent Number: 5,605,462
[45] Date of Patent: Feb. 25, 1997

[54] MOTION IMPARTING APPARATUS

[75] Inventor: Phillip R. M. Denne, Bournemouth, United Kingdom

[73] Assignee: Denne Developments Ltd., Bournemouth, England

[21] Appl. No.: 178,319

[22] PCT Filed: Jul. 12, 1991

[86] PCT No.: PCT/GB92/01279

§ 371 Date: Mar. 14, 1994

§ 102(e) Date: Mar. 14, 1994

[87] PCT Pub. No.: WO93/01577

PCT Pub. Date: Jan. 21, 1993

[30]  Foreign Application Priority Data

Jul. 12, 1991 [GB] United Kingdom .................. 9115180
Feb. 3, 1992 [GB] United Kingdom .................. 9202252
Mar. 12, 1992 [GB] United Kingdom .................. 9205436

[51] Int. Cl.$^6$ .................................................. G09B 9/00
[52] U.S. Cl. ..................... 434/55; 434/45; 434/59; 434/372
[58] Field of Search ..................... 434/29, 30, 32–35, 434/37, 51, 55, 58, 57, 61, 62, 372; 472/60, 2, 7

[56]  References Cited

U.S. PATENT DOCUMENTS

| 3,451,145 | 6/1969 | Holt et al. . | |
| 3,771,462 | 11/1973 | Barthalon et al. . | |
| 3,984,924 | 10/1976 | Myles et al. . | |
| 4,551,101 | 11/1985 | Neumann . | |
| 4,703,297 | 10/1987 | Nagasaka . | |
| 4,752,065 | 6/1988 | Trumbull et al. | 472/60 |
| 4,887,967 | 12/1989 | Letovsky et al. | 434/61 |
| 5,071,352 | 12/1991 | Denne . | |
| 5,209,661 | 5/1993 | Hildreth et al. | 434/45 |
| 5,370,535 | 12/1994 | Prendergast | 434/45 |

*Primary Examiner*—Richard J. Apley
*Assistant Examiner*—Glenn E. Richman
*Attorney, Agent, or Firm*—Watson Cole Stevens Davis, P.L.L.C.

[57]  ABSTRACT

A control mechanism for a simulator or stabilized platform comprising constant force spring device for supporting the weight of the platform and a plurality of impulsive force generating devices preferably in the form of electromagnetic linear rams although a rotary linkage driven by an electric motor would also work. The mechanism provides an agile arrangement at relatively low cost.

7 Claims, 6 Drawing Sheets

MOTION IMPARTING APPARATUS

This invention relates to motion imparting apparatus and is particularly concerned with apparatus for imparting motion to a platform in order to either simulate rides in land borne, water borne or space vehicles or to maintain the platform in a desired orientation.

Such motion imparting mechanisms when used to simulate rides are usually called simulators and are of use in flight training and in the leisure industry and generally comprise a capsule with sound and visual displays and seating facilities and a mechanism by means of which the capsule may have imparted to it motion in a number of degrees of freedom, e.g. heave, pitch and roll.

The capsule is sometimes mounted on a base framework and its movement is normally actuated by hydraulic piston and cylinder units. The positioning of the capsule in its movements of heave (up and down) pitch (nose tilt down and up) and roll (rotation about longitudinal axis) is governed by the relative movements of the piston and cylinder units. In some cases the piston and cylinder units also provide the restraining mechanisms for the capsule, and this is found to cause considerable wear in the bearings and seals associated with those units. British patent specifications nos. 1224505 and 1385186 show arrangements where a triangular base framework for a capsule is suspended from above by three hydraulic piston and cylinder units and these units are selectively operated to provide heave, pitch and roll movements to the capsule. The provision of the necessary gantry or other support structure for such a suspended system creates design difficulties due to the lateral forces present during movement of the capsule.

British patent specification no. 1145213 shows an arrangement for a flight simulator where linkages between hydraulic actuators and the capsule supporting frame act as restraining means as well as force transmitters. The efficiency of the hydraulic actuators is considerably reduced because of the number of bearings and pivots within the system between actuator and capsule supporting frame.

European patent application no. 88309011.0, publication no. 0317062A1, describes a simulator mechanism with a geometrical arrangement having three independently extendible hydraulic actuators capable of changing the simulator operating plane.

There is a demand for small, light and efficient simulator machines but it has become clear that conventional hydraulic actuator based systems are not the best way of achieving such machines due to the fact that they are rigid in their passive state, expensive to assemble and maintain, inefficient and in most cases need to be bolted to a firm foundation.

There is now described an arrangement for controlling movement of a platform in a plurality of degrees of freedom with respect to a base plane comprising resilient means for supporting the weight of the platform and one or more impulse drive actuators for applying an impulsive force between the platform and the base plane to alter the orientation of the platform with respect to the base plane.

The impulse drive actuator is an electromagnetic device in the form of a linear electromagnetic ram. The weight counter balancing means is preferably a long stroke spring member such an air spring and reservoir.

If the base plane is the ground or fixed to the ground then the apparatus becomes a simulator. If, however, the base plane is non-stationary e.g. a ship or vehicle then the platform can be stabilized to maintain (e.g.) a fixed orientation with respect to the horizontal and to absorb sudden changes of height. A stabilized platform, however, requires the addition of one or more motion sensors on the platform or base plane in order to provide computer control apparatus with input signals indicative of actual positions in the requisite number of dimensions. Otherwise, the structure of a stabilized platform is the same as a simulator, all that changes are the computer control parameters.

In the case of a road vehicle the apparatus becomes an "active suspension system".

Other aspects of the present invention are present in the list of features given at the end of the description.

In order that the present invention be more readily understood, an embodiment thereof will now be described by way of example, with reference to the accompanying drawings, in which: FIG. 1 shows a schematic layout of a motion imparting mechanism according to the present invention;

Figure 1:
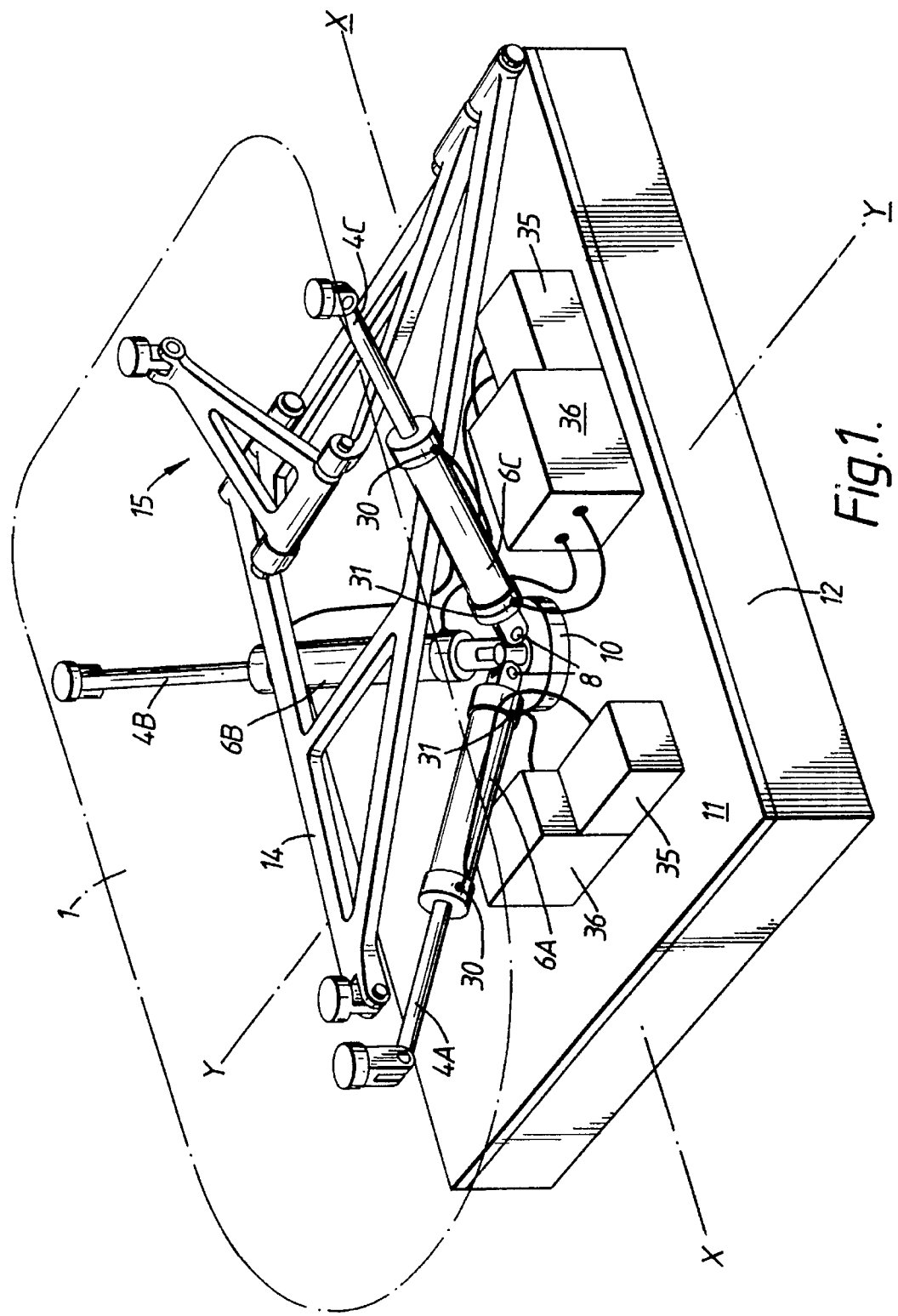

A simulator motion plane 1 indicated in broken lines is pivotally connected by universal joints at three spaced points to the ends of piston rods 4A, 4B, 4C of piston and cylinder units 6A, 6B, 6C. The cylinders are mounted by means of universal joints 8 to a base 10 which in turn is rigidly mounted on a plate which is positioned on a resilient base 12 e.g. of a suitable rubber or foam. Extension or retraction of the pistons simultaneously will raise or lower the capsule 1, while extension or retraction of piston 4B together with a contrary retraction or extension of piston 4C will cause the capsule 1 to roll about an axis parallel to X—X. Extension or retraction of piston 4A relative to the mean length of pistons 4B and 4C will cause the capsule 1 to pitch about an axis parallel to Y—Y. Simultaneous extension and/or retraction of all or any two of the pistons will result in a compound motion of the capsule 1 and this is effected automatically according to a predetermined program. A hinge frame restraining unit 14 holds one point on the centreline of the capsule above the centreline XX of the base plate, whilst allowing the capsule to rise or fall as required.

A second restraining unit is also provided to hold a second point on the capsule centreline above the base centreline XX, thus preventing rotation of the capsule about a vertical axis (yaw) whilst permitting it to pitch and roll and to change its height. The restraining unit is in the form of a knee-jointed two part hinged unit 15 connected to the motion plane 1 by a suitable universal joint.

When the requirements of small simulator machines are analyzed, it becomes clear that the simulator cannot be designed on the basis that the machine is bolted to a firm foundation. It is necessary for the machines to be portable and in many applications it is impossible to bolt them down. The impulsive stresses in the mechanism have to be absorbed in a compliant suspension and this demands that the simulator mechanism base must be mounted on a soft rubber pad, for example, on which the machine can "bounce" easily during its motion. Obviously, the use of mechanically-rigid components such as hydraulic actuators is no longer appropriate because the machine has to be positioned in free space and the actuators no longer have a direct connection with a rigid plane of reference.

Figure 2:
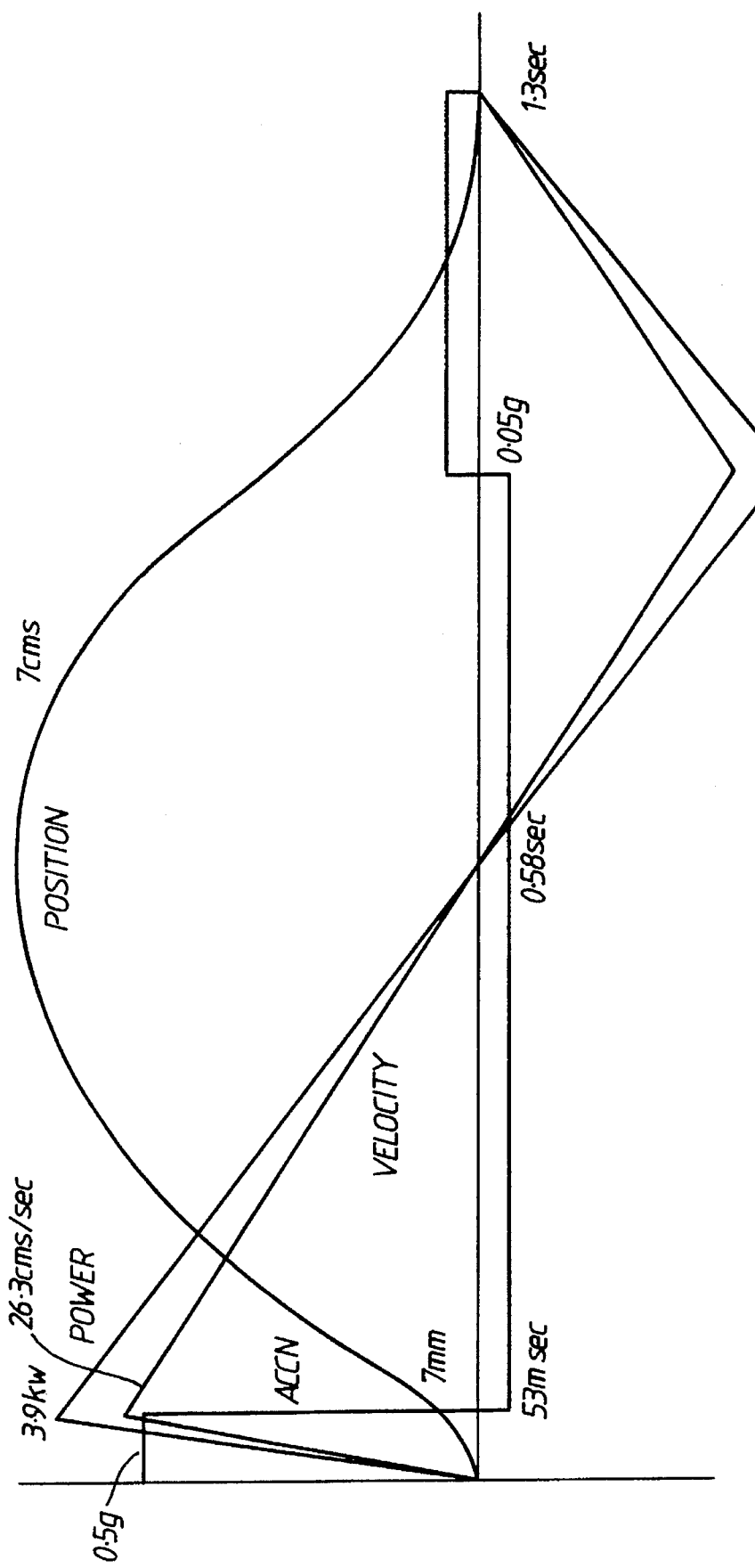
FIG. 2 shows waveforms describing a typical event for a motion imparting mechanism.

FIG. 2 illustrates the motion of a piston and cylinder device which produces a sensation of 0.5 g lasting for 53 milliseconds until the device reaches a top speed of 26.3 cms per second. The illustration shows the acceleration itself and the consequential velocities and displacements to which the human being in a capsule is oblivious. It will be seen that the maximum displacement is in the order of 7 cms, whilst the perceived motion is completed in only 7 mm. It is also to be noted that what is important is the sensation of acceleration.

The present invention utilizes piston and cylinder devices which can provide an impulse which in turn produces the desired sensation of acceleration. In other words energy will only be applied by the devices during acceleration or deceleration. This is achieved according to the present invention by utilizing electromagnetic devices as the piston and cylinder devices 4 of FIG. 1.

It will be understood that an electromagnetic ram system has the further advantage that it is possible to use the electrical power generated by the motion of the ram in order to stop it. For this purpose the control coil is connected to an electrical resistance which determines the rate at which energy is dissipated. This is called dynamic braking.

Figure 3:
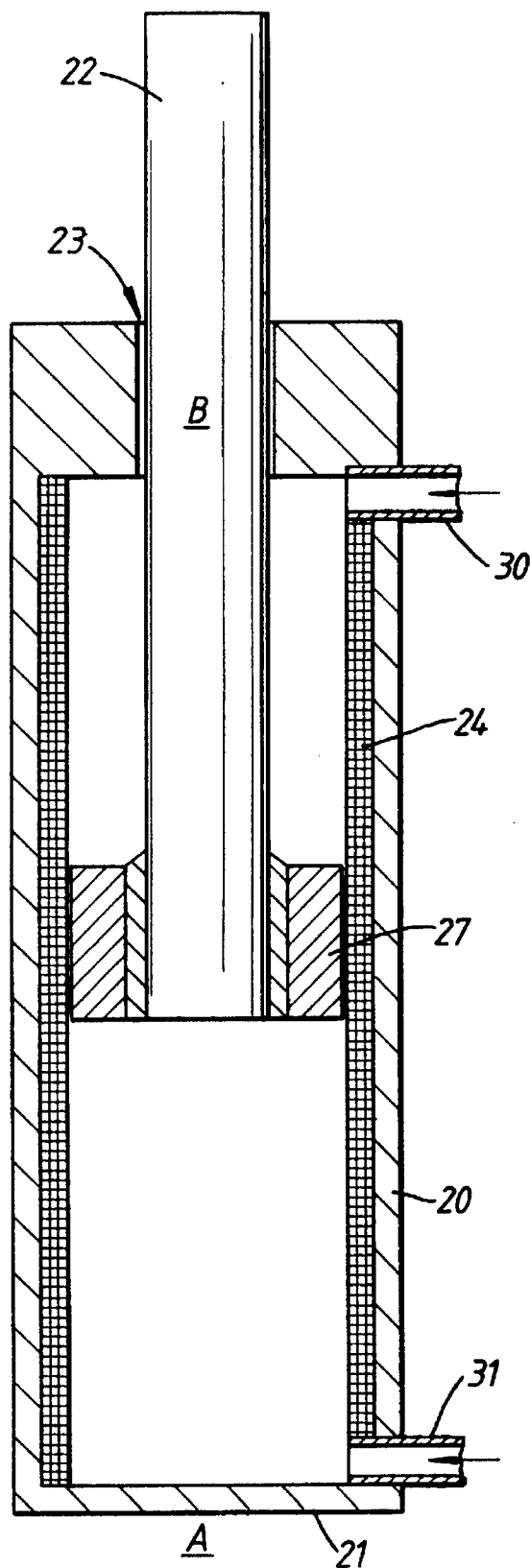
FIG. 3 shows a schematic cross-sectional side view of an actuator for use in the mechanism shown in FIG. 1.

FIG. 3 shows one form of piston and cylinder device utilizing electromagnetic principles. A cylinder 20 of a magnetic material such as steel has one end closed by an end piece 21 and a rod 22 extends through an opening 23 in the other end of the cylinder 20. The cylinder 20 is provided with a coil 24 which is connected via a control unit (not shown) to a power supply. The rod 22 is provided with a piston-like member 27 which is formed from an annular magnet. An opening 30 provides a connection to the interior of the cylinder 20 on one side of the member 27 while a further opening 31 provides a connection to the interior of the cylinder 20 on the other side of the member 27.

As shown in FIG. 1, the opening 30 is connected to an exhaust reservoir 35 while the opening 31 is connected to a pressure reservoir 36. With this arrangement, when a cylinder 20 is filled with compressed air beneath the member 27, the weight of the capsule is just supported by the thrust produced. It will be understood that the piston and cylinder device is thus counter balancing the weight of the capsule. That is to say that the capsule will now behave as though it is supported on a very soft spring system.

It will also be understood that the pressurized fluid within the ram need not be air, but could be hydraulic fluid connected to an external reservoir which contains a pressurized gas to make the system as a whole compressible and resilient.

The capsule can be moved with minimum effort to any chosen pitch and roll attitude or restored to its original straight and level position by a small force only. Providing that the movement of air between the pistons and their external reservoir is freely permitted by the use of short, large diameter pipes there is minimum friction in the system.

In FIG. 3 it will be seen that the ends of the cylinder are securely closed against air pressure and that air connections are fitted into the walls of the cylinder as shown. The piston is arranged to be sealed by some means against the inner wall of the surrounding tube, and the piston rod is sealed in a similar manner and the actuator functions both as a pneumatic spring and also as an electromagnetic force unit.

The method of sealing might be by the use of conventional pneumatic piston seals, both at the piston and at the rod end, but there is also the interesting possibility that a ferro fluid seal could be used. Clearly it is desirable that the air gaps in the system should be reduced to the minimum and it may not be easy to design the piston using a conventional air seal. However, a ferro fluid has the interesting property that it is attracted to a region of high flux density (such as will exist between the piston and the outer cylinder and between the bearing annulus and the piston shaft) and that it requires significant pressure to move the ferro fluid out of this concentrated field region. The ferro fluid can be arranged to have any properties required and in this particular case the property is that of lubrication. Such a seal would therefore consist of a concentration of oil in which the submicron sided particles of magnetic material are suspended as a colloid. The oil will move along the inner shaft of the cylinder with the piston or will remain in the bearing annulus whilst the piston rod moves through it. Ferro fluids are, however, not yet easily obtained and are quite expensive. We are also interested in the paramagnetic property of the ferro fluid, which increases the permeability of the air gap by a factor of 5, thus decreasing the magnetic circuit reluctance.

During the normal process of simulation actuation, when the piston will be moving in a pseudorandom manner and at relatively high speed within the cylinder, the air beneath the piston will be alternately compressed and expanded, so that in order to keep the system pressure constant it will try to move a mass of air backwards and forwards between the piston and the reservoir. The same will occur at the upper end of the cylinder, when the air above piston will be alternately pushed into the exhaust reservoir and withdrawn from it.

To reduce the inevitable friction losses in this process to a minimum the air vent openings must be as large as possible and the path of air flow to the reservoirs must be made smooth and short.

FIG. 1 shows a schematic arrangement using central reservoirs for the two side rams, which further reduces the spring rate of the system for differential movements such as roll. In this case the mass of air which needs to be displaced from beneath the right hand piston (say) as the right hand ram comes down is equal to the mass of air which is needed by the left hand ram as that moves upwards.

It is also possible to pipe the connections to the central ram to the same central reservoirs, but if the centre of mass of the capsule is not directly over the centroid of the triangle formed by the intersection of the actuators with the motion plane, this will require a steady current which would have to be supplied to the actuator coils to hold the capsule straight and level. If separate reservoirs are used, the pressure in the central ram can be adjusted to a different value to that in the side rams and no quiescent power is required.

The objective of the simulator is to apply accelerations to the human occupant, coordinated with the visual imagery in such a way that the occupant believes that the accelerations are larger, and that they continue for longer, than is actually the case. It is acceleration which is sensed and therefore it is acceleration which must be controlled.

It is proposed to utilize a control system for controlling the piston and cylinder devices which control system has direct control loops constructed as "hard" (i.e. fast and accurate) around three DC-coupled acceleration transducers mounted within the capsule along the heave surge and sway axes. The heave axis accelerometer is used to control directly the vertical accelerations applied to the occupant of the simulator; the sway axis accelerometer provides a direct indication of the lateral acceleration felt by the participant in the simulator by way of e.g. centrifugal force (roll-rate). Similarly, the surge axis accelerometer is hard coupled into the surge simulation loop.

It is necessary for the control system to determine the centre of the dynamic range of the simulator motion and to "wipe out" the transient displacements back to this position. "Capsule straight and level" is easily determined as the zero output condition of the lateral accelerometers, but there is no direct indication of vertical position which can be deduced from the heave axis accelerometer; although it is just possible that over a short time interval a double integral of the vertical acceleration could be used to centralize the mechanism to an acceptable accuracy.

Drift and standing offsets in the accelerometers and their amplifiers can be eliminated by a "tare" routine prior to every restart, when the capsule is known to be down and level.

A single angular position transducer may be added to determine the inclination of the fixed-length hinge frame, since this defines the height of the motion plane at any instant. Such a transducer is available as a low cost, reliable and proven component from the motor industry.

The use of three DC accelerometers as the primary control loop transducers and a single angular position transducer within a secondary loop has the following advantages:

1. The control loops determine the actual sensations of the simulator occupants; that which is controlled is that which is actually felt.

2. The control loops are independent of the suspension system characteristics; the capsule behaves as an independent inertial object, like an artist on a trampoline.

3. There are no encumbrances to the piston and cylinder devices and the accelerometers have no moving parts; thus increasing the reliability of the system.

The embodiment described in relation to FIG. 1 uses three independent actuators in which the stresses in the base frame are removed by bringing the lower ends of the actuators together at a substantially single point. The primary reaction forces produced by one actuator then pass through the opposing two actuators. (The actuators are positioned at 120° to each other). But since the three actuators operate synergistically for all movements there is a limit on the ability of the design to provide simultaneous motions in any combination of axes. In addition, a study of the motions of the two side rams shows that either the upper end bearing must be complex (and probably expensive) or that the piston rod must be allowed to rotate during its travel, which may be undesirable.

It is possible to provide a motion imparting apparatus for operating in three degrees of freedom, comprising a base, a movable plane and two pairs of actuators connected between the base and four points on the movable plane which points are spaced apart from each other.

The actuators of each pair are located on the base at a substantially single point but the single point for one pair of actuators need not be coincident with the single point for the other pair of actuators.

Preferably restraining means are coupled between the base and the moveable plane to prevent unwanted motion.

Figure 4:
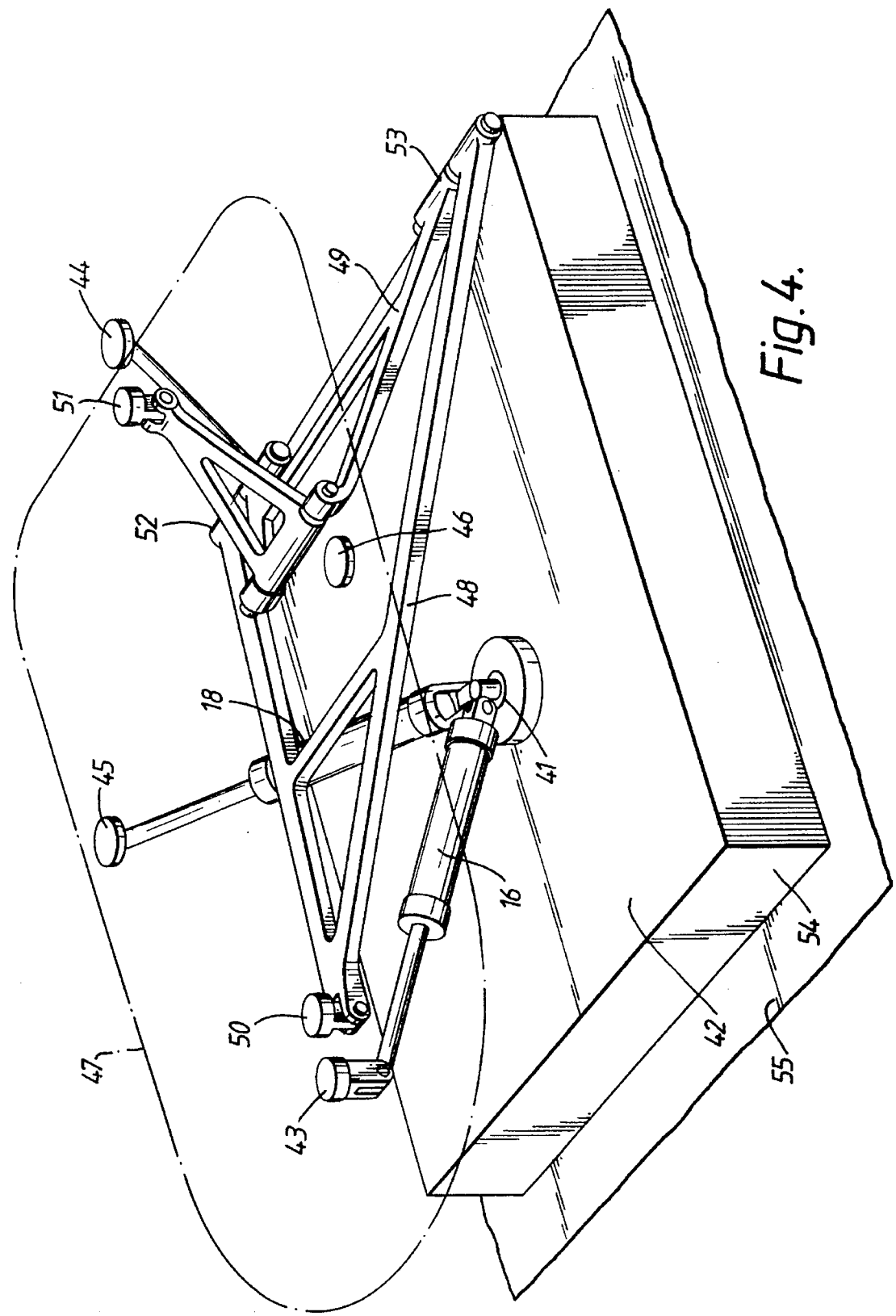
FIG. 4 shows a schematic layout of a modification to the mechanism shown in FIG. 1.

FIG. 4 shows a schematic layout of a typical motion base using this construction, in which four extendible actuators are connected between a substantially single point 41 on the base plate 42 and four locations 43, 44, 45 and 46 in a movable plane 47. It will be understood that the plane 47 is part of the structure of, or is affixed to, the structure of the simulation capsule. The bearings 43 and 44 lie on the central line or "roll axis" of the mechanism and the bearings 45 and 46 lie on an axis perpendicular to the roll axis and form the "pitch axis" of the mechanism, which is so designed that its normal operating position the intersection of the line joining 43 and 44 with the line joining 45 and 46 is vertically above the central point 41.

The actuators connected to 43 and 44 are called the pitch rams and the actuators connected to 45 and 46 are called the roll rams.

A restraint mechanism comprising the single swing frame 48 and the knee-joint frame 49 is connected between the base plate 42 and the moveable plane 47 at two points 50, 51 which may be coincident with bearings 43 and 44 along the roll axis. This form of restraint is shown by way of example and the swing frame 48 might be replaced by two further hinge frames connected to the plane 47 at points equidistant and on the either side of the roll axis such that a line joining the connecting points is perpendicular to the roll axis. The lines joining the hinges of the knee joints on the base plate are preferably at 60° to the line 52, 53 and therefore to each other. In another arrangement the lines are perpendicular to 52, 53 and parallel to each other.

The base plate 2 is supported on a soft rubber or air cushion pad 54, whose function is to absorb the impulsive forces on the base plate 42 whilst the under surface remains in contact with the ground 55. This removes any requirement for ground fixing.

The mechanism functions by using the extendible actuators as two pairs in coordination as follows:

In the loading position both pairs are fully retracted and the moveable plane 47 rests on pads (not shown) which transfer the weight of the capsule to the base plate 42.

Before motion begins, both pairs of actuators are partially extended to raise the plane 47 to mid operating height.

To produce Heave (vertical) motion the pitch rams and the roll rams are energized simultaneously and in the same direction to increase or decrease the height of 47 above 42.

To produce Pitch motion the rams 46 and 47 (not shown) are driven in opposite directions, the roll ram extensions remaining fixed.

To produce Roll motion the rams 48 and 49 (not shown) are driven in opposite directions, the pitch ram extensions remaining fixed.

It will be clear that the Pitch and Roll actions are completely independent and there is no limit to roll movement set by a large Pitch movement, or vice versa. The mathematics of control of the mechanism are also simpler.

Also, although the drawing shows both pairs of actuators pivotally mounted on the base at a single point, this is not essential. It is conceivable that in some applications the mounting point on the base for the Pitch rams 46, 47 will not be coincident with the mounting point on the base for the Roll rams 48, 49. The basic operation of the latter arrangement is the same as for the arrangement shown.

It is also clear that a Pitch motion only requires the action of two rams, whereas in the prior art of GB8722853 three rams must be used, consuming more power.

Because both pairs of (total 4) rams cooperate in the Heave motion, which is the most power-demanding action of the mechanism, the individual ram thrusts may be smaller and the devices therefore cost less.

When one uses an pneumatic-air-spring suspension such as is described in relation to FIG. 1, the pairing of actuators allows the spring-rate reservoir to be shared, so that air transferred out of one ram is matched by air demanded by its opposite number, thus reducing the effective spring rate.

The arrangement retains the property that the primary reactions to the ram forces do not pass through the restraining mechanism but return through the opposing ram of the pair to a central point 41 on the base plate 42. The forces on the restraining mechanism are solely due to off-axis and out-of-balance loads, thus reducing the size, weight and cost of the frames 48 or 49. The central point of the roll pair need not be coincident with the central point of the pitch pair to achieve this effect, although it is preferable that both points lie directly beneath the roll axis.

This arrangement allows the bearings 43, 44, 45 and 46 to be simpler and therefore of lower cost than for GB 8722853. This is because the forces of action and reaction pass through the bearings in the same plane in which the actuator itself swings upwards or downwards, (i.e 41, 43, 44 or 41, 45, 46) and can be simple pivots. (It is of course necessary to allow for the motion of the plane 47 perpendicular to the pivot, but this is easily provided by a knuckle or flexure).

The shaft of the actuator is not caused to rotate during its movement, in fact it is prevented from doing so by the simplicity of the bearings.

Figure 5:
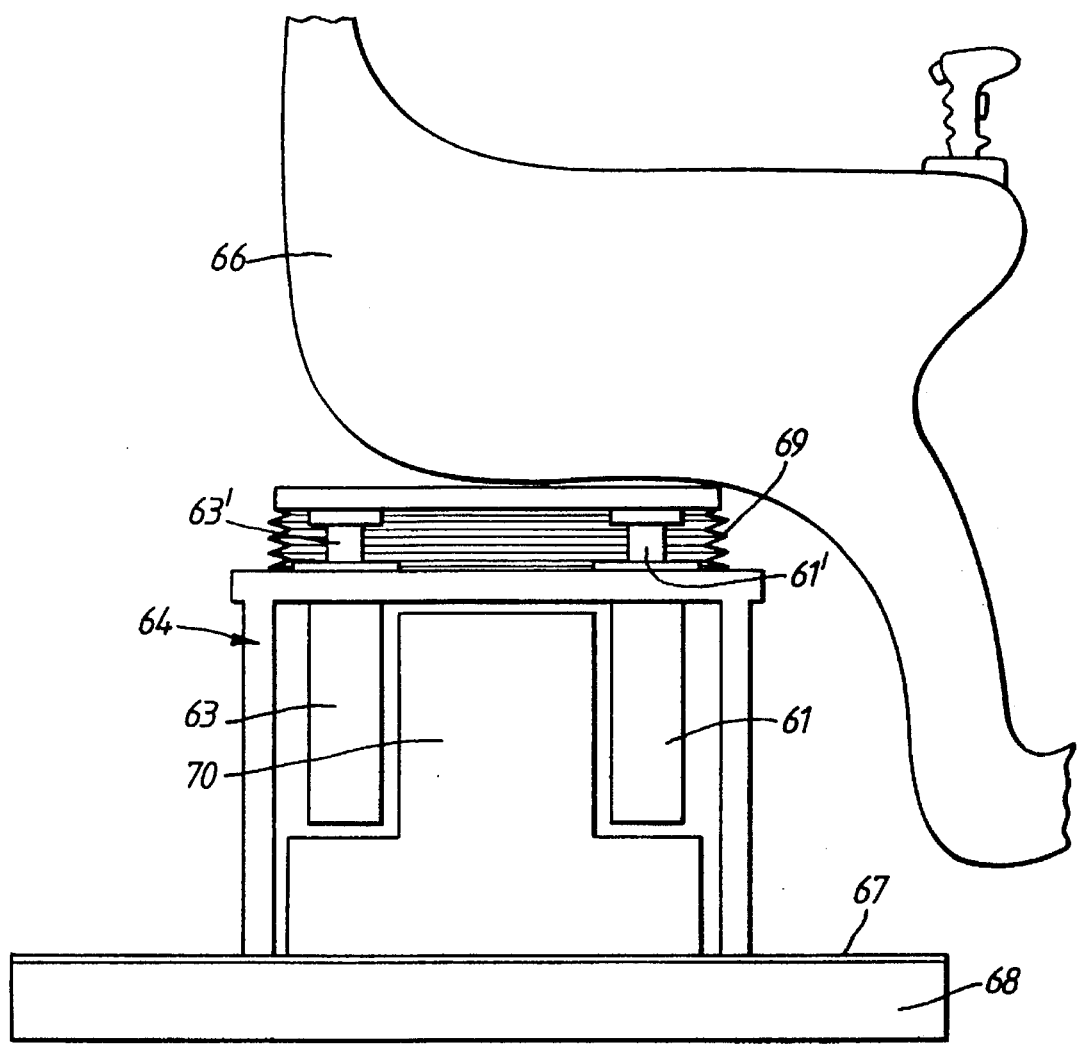
FIG. 5 shows a schematic side view of an alternative motion imparting mechanism according to the present invention.
Figure 5:
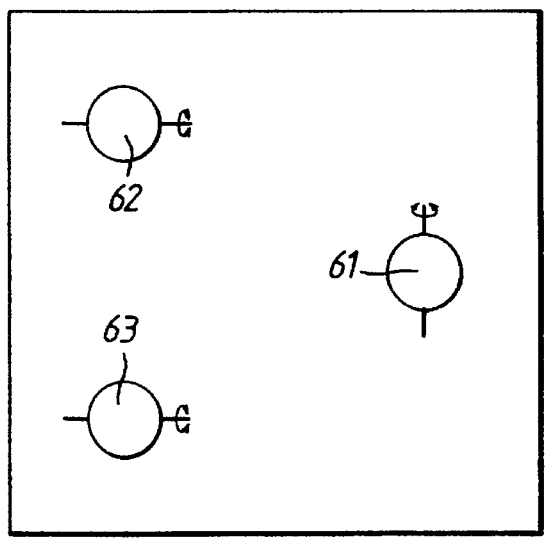

Another embodiment of the present invention is shown in FIG. 5 which illustrates a seat motion base.

Three actuators 61, 62, 63 are mounted beneath the seat frame 64 so that the shafts 61', 62', 63' of the actuators protrude upwards and support the underside of a seat moulding 66 which also carries armrests, backrest, controls, seat belt and footbar. The seat frame 64 is mounted on a base plate 67 which in turn rests on a resilient pad 68 e.g. a soft rubber.

The actuators are surrounded by a corrugated bellows 69 which, because it cannot be displaced laterally in any direction but it will nevertheless accept pitch and roll movements and vertical translation, acts as a simple restraint mechanism.

It is interesting to note that the bellows restraint itself could be used as a support system. For example, if it is so designed to have an area of approximately 2 sq.ft (say 1.4ft.square or a circle 19 ins in diameter) it will require a pressure of 1.6 psi or 0.11 Kg/sq.cm. However, the disadvantage of a single bellows support system is that it is not tolerant of any deviations of the centre of gravity from the centre of pressure of the support area. (It will tip backwards if the occupant leans backwards and so on). All such imbalance would have to be corrected by currents flowing continuously in the actuator coils, whereas with pneumatic spring actuators with at least two sets of reservoirs the imbalance can be corrected by a slow-acting pneumatic servo.

It is also worth noting that the air reservoir 70 for the actuator pistons, if these are themselves designed to carry the deadload, could be constructed as shown to be placed under the seat frame 64. Because the diameter of a 7.5 cm ram means that its volume is significant (1.3 litres for 300 mm stroke) the air reservoirs themselves will have significant volume and will be difficult to accommodate in the confined space. Reducing the diameter and therefore the volume of the rams will increase the pressure required to balance the system but it will also reduce the volume of reservoirs.

Conversely, operating the system at low pressure is safer (because the energy density is less) but it does require a significant reservoir volume which has to be accommodated within the lower parts of the seat mechanism.

Whilst the electromagnetic actuator has been described as having a coil fixed to the cylinder with an annular magnet forming a piston it will be appreciated that a number of variants could be constructed which would have the same magnetic effect e.g. by providing a coil on the piston and/or replacing the coil on the cylinder with a permanent magnet or other combinations.

It should be noted that the arrangement shown in FIG. 3 is merely illustrative of the basic design of such actuators; practical designs incorporate modifications to improve the efficiency of the system.

For example, the coil may be segmented into at least three overlapping sections which are selected according to the instantaneous position of the magnetic piston. This reduces the power lost in the electrical resistance of the coil and minimises the forcecancelling effect of flux leaking back through regions of the coil away from the magnet. The selection of the active coil segment(s) may be any means, such as commutative electrical brushes, Hall-effect switches which sense the magnet position, or by a microprocessor or other logical device programmed with reference to a position transducer.

Since in the arrangement of FIG. 3, the reluctance of the flux return path through the actuator shaft increases significantly as the piston moves away from the shaft bearing, several measures can be taken to improve the design. For example, the shaft may be permanently secured at A, extending through to B, and the piston may be fixed to a steel tube surrounding the central shaft and sliding upon it, extending out through the bearing at B to form the actuator element.

Figure 6:
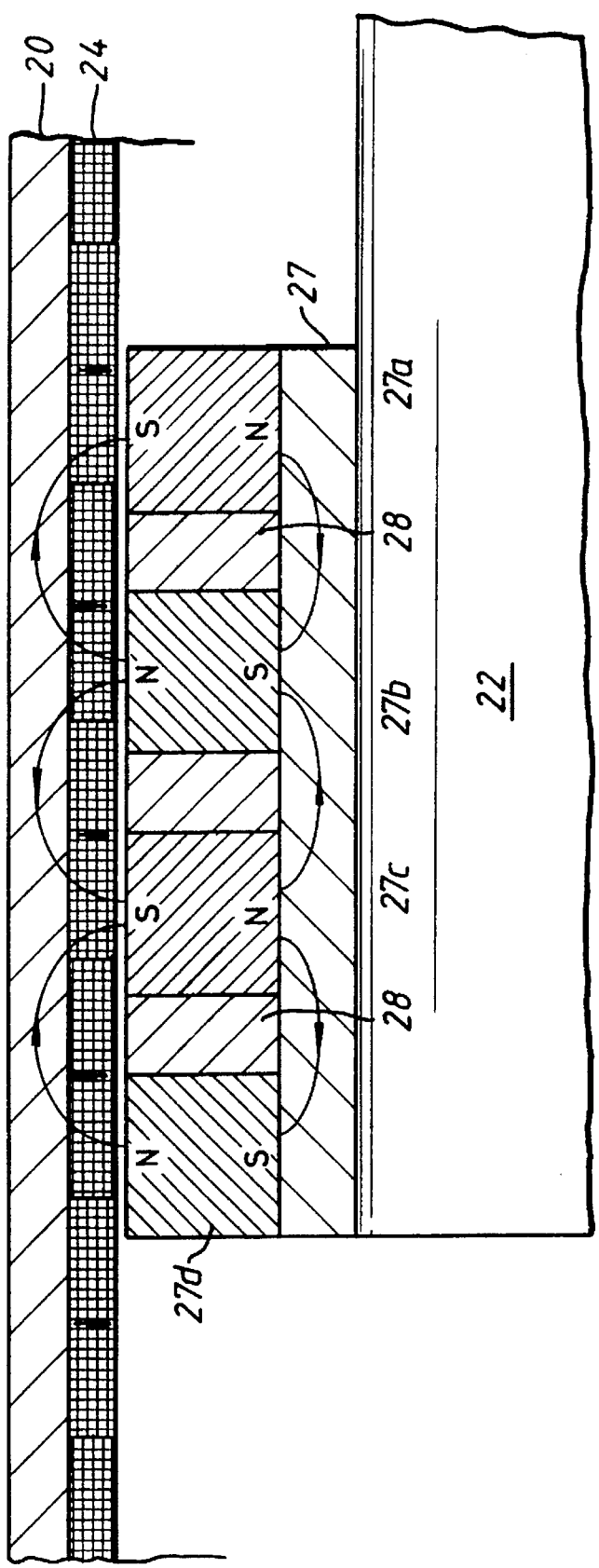
FIG. 6 shows a schematic view of part of an electromagnetic actuator with improved efficiency.

In general, the most effective approach to an efficient magnetic circuit is to arrange to balance the flux as closely as possible to the moving piston. For example, as shown in FIG. 6 where the same referred numerals are used as were used in FIG. 3, the piston may be subdivided into any even number of magnets 27a, 27b, 27c, 27d of equal strength and alternately opposite polarity so that the linking flux passes through the external steel of the cylinder 20 and through the coil 24. Because the flux in one region passes outwards and in a nearby region it passes inwards, it will be clear that the coil 24 must be further segmented and wound in the opposite sense in different regions, and that the position-sensitive selector mechanism must determine which coil segments are in circuit and in what polarity they are to be connected. The coil segments are preferably "skew wound" so that the transition between one arrangement and the next occurs smoothly.

As shown, the magnets 27a–27d are located in slots formed by annular walls 28. It is possible to locate the coil segments 24 in slots also.

While the piston 27 is shown as being provided with permanent magnets, it is possible to replace these by coils.

Linear actuators may be designed to be equivalent to any chosen type of electric motor, DC or AC, by the following conceptual transformation:

1. Cut open the field and armature of an electric motor along a plane which terminates on the line of the shaft axis.

2. Unroll the electromagnetic system until the cylindrical motor casing becomes a flat strip.

3. Take the strip by its long sides and bring them together in a circular arc to form a long cylinder. Do the same to the armature strip within the field windings cylinder and mount the actuator rod to the new armature unit or "piston", at right angles to the previous shaft axis.

The features of the above described embodiments are listed below and, where appropriate may be used either alone or in sub-combination. The present disclosure is intended to cover the individual features as well as sub-combinations of the features notwithstanding the descriptions of certain combinations of all the features given in relation to the accompanying drawings.

Features:

A simulation motion system in which the base is deliberately arranged to be flexible or compliant or free-moving.

The design of simulator motion mechanisms of whatever type and application in which the capsule is counterbalanced by (e.g.) a constant force spring device.

The use of one or more gas springs as part of the spring counterbalance assembly.

The use of an actuator system which produces an impulse rather than a force which depends on the actuator position.

The synergistic use of linear electromagnetic actuators of any type (including rotary electric motors and gear/crank mechanisms) in the positioning of an object such as a simulator capsule in more than one degree of freedom.

The combination of a linear electromagnetic actuator and a fluid ram.

The control of the simulator capsule as an Inertial Object, whose absolute position and orientation are not determined by rigid connection to a nearby fixed object.

The use of accelerometers in a control system for a simulator driven by actuators of the impulse type.

The use of a routine "tare" operation to correct for drift in simulator control accelerometers and their associated amplifiers.

The use of external reservoirs to decrease the "spring rate" of the gas spring of a simulator motion system counterbalance assembly.

The use of coupled reservoirs to further reduce the spring rate for symmetrical movements such as roll.

The use of ferro fluid seal/lubricant in a permanent magnet type of electromagnetic ram assembly.

The use of dynamic braking in the control of a simulator motion system.

The use of a ribbed bellows as the restraint mechanism for a small simulator of any type.

The design of a motion mechanism for one or more seats (FIG. 5).

The use of a ribbed bellows as an air spring external to the electromagnetic ram(s).

The use of segmented coils to improve efficiency.

The selection of active coil segments and their appropriate polarity by means of mechanical commutators, Hall-effect switches and/or microprocessor selection according to signals from a position transducer.

The use of skew-wound coils to produce smooth transitions between coil selections.

The design of electromagnetically-balanced permanent magnet armatures (pistons) from an even number of opposing magnets arranged parallel to the actuator shaft or transversely thereto.

The design of linear actuators of any type by topographical transformation of an equivalent design of electric (rotary) motor.

I claim:

1. An arrangement for controlling relative movement in a plurality of degrees of freedom between a platform and a reference plane comprising a fluid ram and pressurized gas reservoir for counterbalancing the weight of a platform, at least one electromagnetic impulse drive actuator in the form of a linear electromagnetic ram for applying an impulsive force between the platform and the reference plane, and control means for controlling the actuator to alter the instantaneous position or orientation of the platform with respect to the reference plane in a predetermined manner, wherein the fluid ram and the electromagnetic ram form a combined assembly.

2. An arrangement according to claim 1, including a plurality of combined assemblies of fluid and electromagnetic rams.

3. An arrangement according to claim 1 and comprising motion sensing means for detecting motion of the platform and providing input signals to the control means for maintaining the platform stabilized with respect to any chosen external reference.

4. An arrangement according to claim 3, wherein the platform is a part of a vehicle.

5. An arrangement according to claim 1, wherein there are four actuators with the actuators coupled in pairs.

6. An arrangement according to claim 1, and comprising a linkage between the platform and the reference plane for constraining movement of the platform.

7. An arrangement according to claim 1, wherein a passenger carrying member is mounted on the platform.

* * * * *